(12) United States Patent
Fukuda et al.

(10) Patent No.: US 11,230,291 B2
(45) Date of Patent: Jan. 25, 2022

(54) VEHICLE CONTROL SYSTEM

(71) Applicant: TOYOTA JIDOSHA KABUSHIKI KAISHA, Toyota (JP)

(72) Inventors: Hiroki Fukuda, Shizuoka-ken (JP); Yoshinori Watanabe, Isehara (JP); Yuta Asaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 16/748,916

(22) Filed: Jan. 22, 2020

(65) Prior Publication Data

US 2020/0247413 A1 Aug. 6, 2020

(30) Foreign Application Priority Data

Feb. 6, 2019 (JP) .............................. JP2019-019941

(51) Int. Cl.
   *B60W 30/18* (2012.01)
   *G05D 1/02* (2020.01)
   *B60W 30/10* (2006.01)

(52) U.S. Cl.
   CPC ...... *B60W 30/18163* (2013.01); *B60W 30/10* (2013.01); *G05D 1/0219* (2013.01)

(58) Field of Classification Search
   CPC . B60W 30/1863; B60W 30/10; G05D 1/0219
   See application file for complete search history.

(56) References Cited

U.S. PATENT DOCUMENTS

| | | | |
|---|---|---|---|
| 2017/0091564 A1* | 3/2017 | Kawasaki | B60W 30/12 |
| 2018/0281804 A1* | 10/2018 | Talamonti | G08G 1/205 |
| 2021/0024065 A1* | 1/2021 | Mizoguchi | B60W 30/18163 |

FOREIGN PATENT DOCUMENTS

| | | | |
|---|---|---|---|
| JP | 2007-8281 | * | 1/2007 |
| JP | 2015-191445 A | | 11/2015 |

* cited by examiner

*Primary Examiner* — Michael J Zanelli
(74) *Attorney, Agent, or Firm* — Sughrue Mion, PLLC

(57) ABSTRACT

A vehicle control system includes a controller for generating a target path for the vehicle to change a lane from a main lane to a diverging lane in a diverging zone from a diverging start point to a diverging end point, and causing the vehicle to travel so as to follow the target path. Here, the diverging lane include a plurality of lanes divided into a first diverging lane farthest from the main lane and a second target diverging lane closer to the main lane than the first diverging lane. The controller is configured to generate the target path based on a diverging partition line that partitions the main lane and the diverging lane in the diverging zone when traveling from the main lane through the second diverging lane of the diverging lane toward a destination.

11 Claims, 7 Drawing Sheets

VEHICLE CONTROL SYSTEM

CROSS-REFERENCE TO RELATED APPLICATION

The present application is based on, and claims priority from, Japanese Patent Application Serial Number 2019-019941, filed on Feb. 6, 2019, the disclosure of which is hereby incorporated by reference herein in its entirety.

FIELD

The present disclosure relates to a vehicle control system, and more particularly, to a vehicle control system that assists in changing a lane of a vehicle.

BACKGROUND

Japanese Patent Application Laid-Open No. 2015-191445 discloses a technique relating to a driving assistance apparatus capable of providing steering support based on lane marking even on diverging roads. In this technique, lane markings existing on the right and left in the traveling direction of the vehicle are detected, and the curvatures of these right and left lane markings are calculated. Then, out of the calculated curvatures of the left and right lane markings, the lane marking having a curvature with a small difference from the curvature of the course specified as the traveling direction is selected as the lane marking of the lane traveled by the vehicle. Thereby, steering assistance can be performed based on the lane marking in the traveling direction of the vehicle appropriately selected in the diverging roads.

SUMMARY

Incidentally, some diverging roads diverging from the main lane include a plurality of diverging lanes. In such a diverging roads, it is general that only the diverging lane that is the outermost side with respect to the main lane among the plurality of diverging lanes has an outer lane marking continuous from the main lane. Therefore, when the above-mentioned technique is applied to such a diverging roads, depending on the diverging lane of the destination, it may be necessary to temporarily change the lane to the outermost diverging lane with respect to the main lane, and then to change the lane to the diverging lane closer to the main lane. Since the behavior of the vehicle due to the interventional operation of such a system follows a path different from that in the case of the manual driving of the driver, it may lead to discomfort and psychological anxiety of the driver.

The present disclosure has been made in view of the above-mentioned problems, and an object thereof is to provide a vehicle control system capable of suppressing the number of lane changes and resolving the driver's sense of discomfort when the lane is changed to a diverging lane having a plurality of lanes by automated driving.

In order to solve the above problems, the first disclosure is applied to a vehicle control system mounted on a vehicle. The vehicle control system includes a controller for generating a target path for the vehicle to change a lane from a main lane to a diverging lane in a diverging zone from a diverging start point to a diverging end point, and causing the vehicle to travel so as to follow the target path. Here, the diverging lane includes a plurality of lanes divided into a first diverging lane farthest from the main lane and a second target diverging lane closer to the main lane than the first diverging lane. The controller is configured to generate the target path based on a diverging partition line that partitions the main lane and the diverging lane in the diverging zone when traveling from the main lane through the second diverging lane of the diverging lane toward a destination.

The second disclosure has the following further features in the first disclosure.

The controller is configured to execute a first target path generation process and a second target path generation process. The first target path generation process is configured to generate a first target path that reaches the lane change end point in the diverging lane after crossing the diverging partition line from the lane change start point in the main lane. The second target path generation process is configured to generate a second target path that travels in parallel along the diverging partition line from the lane change end point.

The third disclosure has the following further features in the second disclosure.

The controller is configured to set a position obtained by offsetting a predetermined amount from the diverging partition line to a side of the diverging lane to the lane change end point.

The fourth disclosure has the following further features in the third disclosure.

The second diverging lane is a lane closest to the main lane. The predetermined amount is set to ½ of a width of the second diverging lane.

The fifth disclose has the following further features in the second disclosure.

The controller is configured to set the lane change start point and the lane change end point such that a predetermined distance from the lane change start point to the lane change end point is equal to or less than a distance obtained by multiplying a limited vehicle speed in the target path by a predetermined time.

The sixth disclose has the following further features in the fifth disclosure.

The predetermined distance is equal to or greater than a predetermined minimum distance.

The seventh disclose has the following further features in the fifth disclosure.

The controller is configured to set the diverging start point to the lane change start point.

The eighth disclose has the following further features in the seventh disclosure.

The controller is configured to set the diverging end point to the lane change end point when the predetermined distance is longer than a length of the diverging zone.

The ninth disclose has the following further features in the eighth disclosure.

The controller is configured not to perform the second target path generation process when the diverging end point is set to the lane change end point.

The tenth disclose has the following further features in the second disclosure.

The first target path generation process is configured to generate the first target path such that a traveling direction of the vehicle is parallel to the diverging partition line at the lane change end point.

The eleventh disclose has the following further features in the first disclosure.

The controller is configured to use a virtual partition line obtained by offsetting an outer lane marking defining a lane boundary of the main lane by a lane width of the main lane as the diverging partition line.

According to the vehicle control system of the first disclosure, when the lane is changed from the main lane to the second diverging lane of the diverging lane, the target path is generated based on the diverging partition line separating the main lane and the diverging lane. This makes it possible to generate a target path for lane change from the main lane to the second diverging lane even when there is no continuous lane marking from the main lane to the second diverging lane. As a result, it is not necessary to change the lane from the main lane to the first diverging lane, so that it is possible to suppress the number of lane changes and to solve the driver's discomfort.

According to the second disclosure, a target path is generated which travels from the lane change start point in the main lane to the lane change end point in the diverging lane, and then travels in parallel along the diverging partition line. According to such a target path, it is possible to smoothly approach the second diverging lane in the diverging lane.

According to the third disclosure, since the offset amount is set with reference to the diverging partition line, it is possible to accurately set the lane change end point in the diverging lane regardless of the lane condition of the diverging lane on the side away from the main lane.

According to the fourth disclosure, since the lane can be smoothly changed to the second diverging lane in the diverging lane, the behavior at the time of the lane change can be stabilized.

According to the fifth disclosure, since the maximum value of the predetermined distance is set by using the limited vehicle speed, it is possible to more adapt the traveling condition of the surrounding vehicle than in the case of using the actual vehicle speed of the vehicle.

According to the sixth disclosure, since the predetermined distance from the lane change start point to the lane change end point can be set to a predetermined minimum distance or more, it is possible to suppress an abrupt lane change and stabilize the behavior.

According to the seventh disclosure, the diverging start point from the main lane to the diverging lane is set to the lane change start point. This makes it possible to promptly start the lane change after passing through the diverging start point.

According to the eighth disclosure, when the predetermined distance is longer than the diverging zone, the diverging end point is set to the lane change end point. This makes it possible to reliably change the lane in the diverging zone.

According to the ninth disclosure, it is possible to realize the lane change from the main lane to the second diverging lane of the diverging lane even when the second target path generation process cannot be performed.

According to the tenth disclosure, it is possible to smoothly transition from the lane change end point to the second diverging lane in the diverging lane.

According to the eleventh disclosure, the virtual partition line obtained by offsetting the outer partition line of the main lane by the lane width is used as the partition line. Thus, even when a lane corresponding to the diverging partition line is not marked, the diverging partition line can be specified.

As described above, according to the present disclosure, it is possible to provide a vehicle control system capable of suppressing the number of lane changes and resolving the driver's sense of discomfort when traveling in a diverging lane having a plurality of lanes.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

Figure 1:
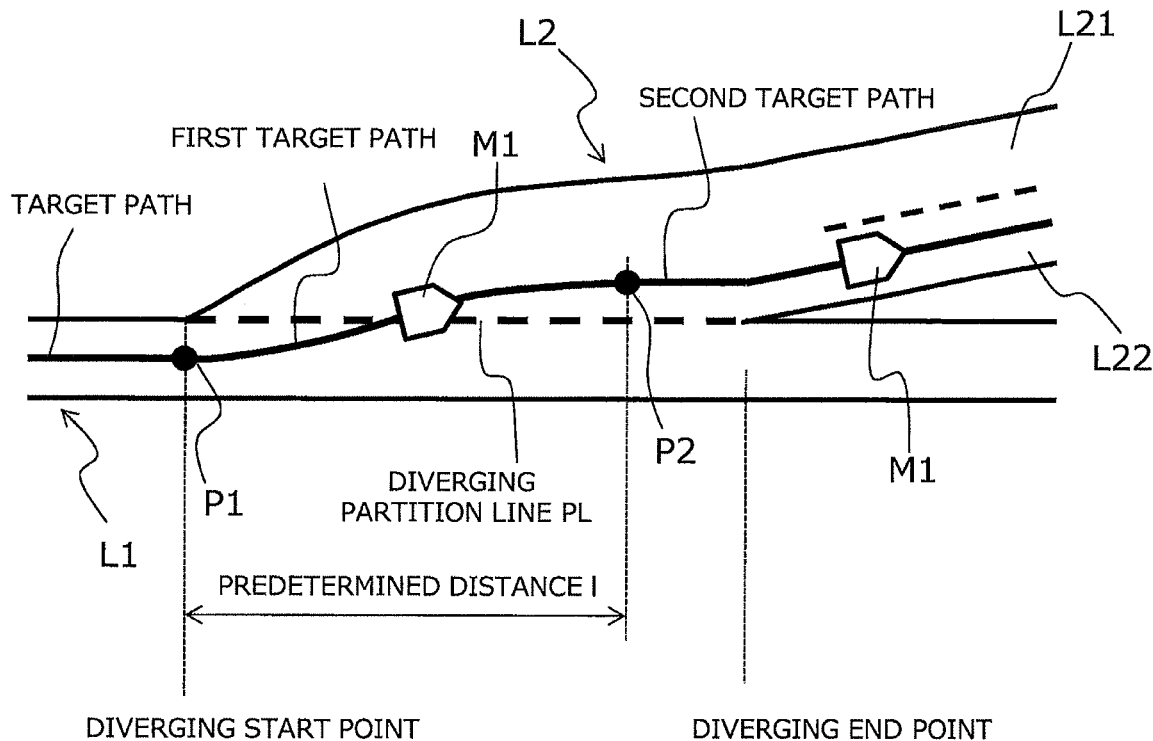
FIG. 1 is a conceptual diagram for explaining lane change control by the vehicle control system according to the first embodiment.
Figure 2:
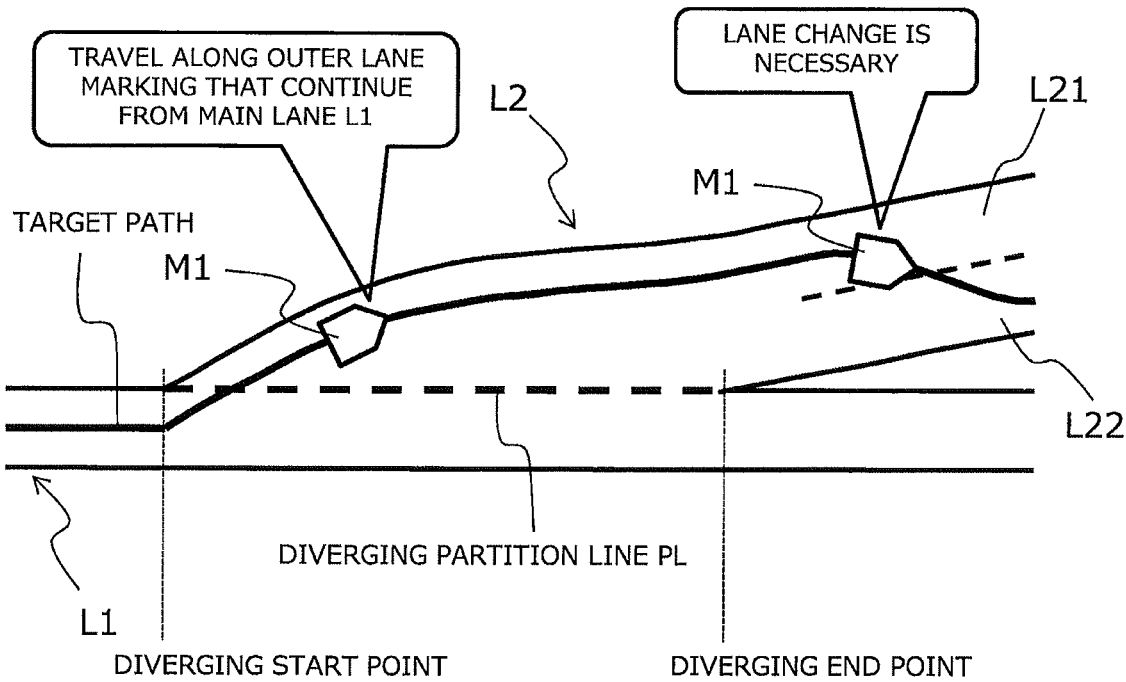
FIG. 2 is a conceptual diagram for the explaining lane change control of a comparative example.

1. First Embodiment 1-1. Summary of Lane Change Control by Vehicle Control System FIG. 1 is a conceptual diagram for explaining lane change control by a vehicle control system according to the first embodiment. FIG. 2 is a conceptual diagram for explaining the lane change control of a comparative example. A vehicle control system is mounted on a vehicle, and performs lane change control for performing lane change on a diverging road by automated driving.

In the following description, the vehicle on which the vehicle control system is mounted is referred to as "vehicle M1". In addition, the lane in which the vehicle M1 is traveling before the lane change is denoted as "main lane L1", and the lane diverging from the main lane is denoted as "diverging lane L2". In the case where the diverging lane is divided into a plurality of lanes, the diverging lane L2 located farthest from the main lane L1 is denoted as "first diverging lane L21", and the diverging lane L2 located closer to the main lane than the first diverging lane L21 is denoted as "second diverging lane L22". In the following description, the case where the second diverging lane L22 is configured by a single lane is exemplified, but the second diverging lane L22 may be configured to include a plurality of lanes.

In the following description, the starting point of the diverging from the main lane L1 to the diverging lane L2 is referred to as a "diverging start point", and the end point of the diverging from the main lane to the diverging lane is referred to as a "diverging end point". Further, the lane zone from the diverging start point to the diverging end point is denoted as a "diverging zone", and the boundary line which partitions the main lane and the diverging lane in the diverging zone is denoted as a "diverging partition line PL". Note that the diverging partition line PL is not limited to a partition line such as a white line marked on an actual road surface, and includes a virtual partition line that partitions a main lane and a diverging lane.

A case where the path for the vehicle M1 to the destination includes a lane change from the main lane L1 to the second diverging lane L22 will be considered. As shown in FIG. 2, the lane marking that partitions the second diverging lane L22 and the first diverging lane L21 generally exists from the midway through the diverging lane. In this case, since there is no continuous lane marking from the main lane to the second diverging lane L22, the second diverging lane L22 cannot be reached even if the vehicle travels along the outer lane marking which partitions the lane boundary on the left side in the traveling direction of the vehicle M1 from the main lane L1.

Therefore, for example, in the comparative example shown in FIG. 2, first, the target path is set so as to enter the diverging lane L2 along the lane marking on the left side in the traveling direction of the vehicle M1. Thereafter, after recognizing the lane marking that partitions the second diverging lane L22 and the first diverging lane L21, the target path is set so as to change the lane from the first diverging lane L21 to the second diverging lane L22. By traveling the vehicle M1 so as to follow such a target path, it is possible to change the lane from the main lane L1 to the second diverging lane L22.

However, the lane change control according to the comparative example has the following problems. That is, the number of lane changes is increased as compared with the case where the driver performs lane changes by manual operation. This leads to discomfort and psychological anxiety of the driver.

Therefore, the vehicle control system according to the present embodiment generates a target path based on the diverging partition line PL when the path to the destination of the vehicle M1 includes a lane change from the main lane L1 to the second diverging lane L22. Hereinafter, the present embodiment will be described in more detail with reference to FIG. 1.

In the example of the lane change control shown in FIG. 1, the point at which the lane change from the main lane L1 to the diverging lane L2 is started is denoted as a "lane change start point P1", and the point at which the lane change ends is denoted as a "lane change end point P2". In the example of the lane change control shown in FIG. 1, the lane change start point P1 is set as the diverging start point, and a point that travels a predetermined distance from the lane change start point P1 and is offset from the diverging partition line PL to the side of the diverging lane L2 by a predetermined amount is set as the lane change end point P2. The predetermined distance may be set to, for example, a distance obtained by multiplying the restricted vehicle speed of the diverging lane by a predetermined time, for example, 9 seconds. The predetermined amount may be set to, for example, a length of ½ of the lane width of the second diverging lane L22.

The target path traveling from the lane change start point P1 to the lane change end point P2 is called a "first target path". The first target path can be set by, for example, a cubic polynomial with respect to the diverging partition line PL. At this time, it is preferable that the first target path is set so that the vehicle M1 faces the direction parallel to the diverging partition line PL at the lane change start point P1 and the lane change end point P2. The method of setting the first target path will be described in detail later.

The target path traveling from the lane change end point P2 to the diverging end point is called a "second target path". As the second target path, a path traveling in parallel along the diverging partition line PL from the lane change end point P2 is set. After the diverging end point, the target path is set so as to travel along the lane marking of the second diverging lane L22.

According to such lane change control, the number of lane changes may be reduced as compared with the control of the comparative example. This suppresses discomfort and psychological anxiety of the driver.

1-2. Configuration Example of Vehicle Control System

Figure 3:
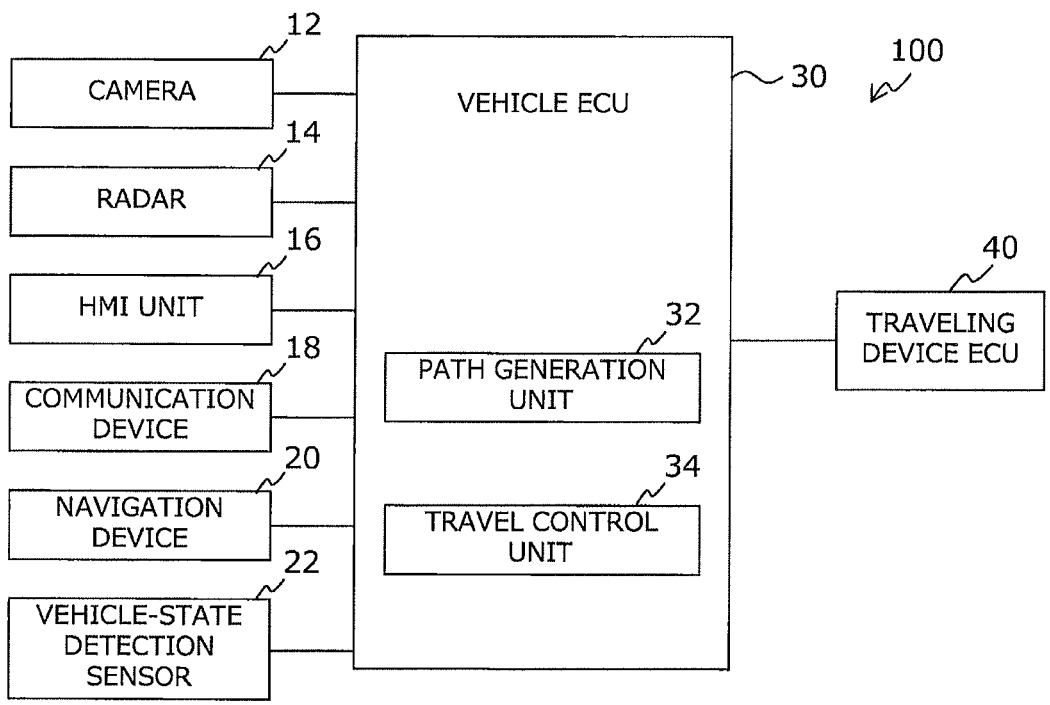
FIG. 3 is a block diagram showing an example of the configuration of the vehicle control system according to the first embodiment.

Next, a configuration example of a vehicle control system that executes the lane change control described above will be described. FIG. 3 is a block diagram showing a configuration example of the vehicle control system according to the first embodiment. A vehicle control system 100 shown in FIG. 3 is mounted on the vehicle M1. Examples of the vehicle M1 include a vehicle in which an internal combustion engine is mounted as a power source, an electronic vehicle in which an electric motor is mounted as the power source, and a hybrid vehicle including the internal combustion engine and the electric motor. The electric motor is driven by a battery such as a secondary battery, a hydrogen fuel cell, a metal fuel cell, an alcohol fuel cell, or the like.

The vehicle control system 100 is a system for performing automated driving of the vehicle M1. The vehicle control system 100 includes an electronic control unit (hereinafter also referred to as "vehicle ECU") 30 for automated driving control. The vehicle control system 100 includes a camera 12, a radar 14, an HMI unit 16, a communication device 18, a navigation device 20, and a vehicle-state detection sensor 22, which are connected to inputs of the vehicle ECU 30. The vehicle control system 100 further includes an electronic control unit (hereinafter referred to as "ECU") 40 for a traveling device connected to the output side of the vehicle ECU 30.

The camera 12 functions as information acquisition means for acquiring peripheral information of the vehicle M1, for example, a front camera for capturing an image of the front of the vehicle M1, a left rear camera for capturing an image of the left rear of the vehicle M1, and a right rear camera for capturing an image of the right rear of the vehicle M1. The images picked up by the camera 12 are transmitted as image data to the vehicle ECU 30 at any time, and are subjected to image processes on the respective image data in the vehicle ECU 30. The peripheral information acquired by the camera 12 is, for example, positional information of peripheral vehicles traveling around the vehicle M1, lane marking information such as white lines, and road information such as signal information.

The radar 14 is, for example, a laser radar, a millimeter wave radar, or the like, and functions as information acquisition means for acquiring peripheral information of the vehicle M1. The radar 14 transmits a laser wave or the like to the front and the rear of the vehicle M1, respectively, and receives the reflected wave to acquire peripheral information of the vehicle M1. The peripheral information acquired by the radar 14 includes, for example, information on the presence or absence of a peripheral vehicle, distance to the peripheral vehicle, angle (i.e., relative position) and speed (i.e., relative speed) information, and positional information of utility poles, buildings, or the like. The information detected by the radar 14 is transmitted to the vehicle ECU 30 at any time.

The HMI unit 16 is an interface for providing information to the driver and accepting information from the driver. For example, the HMI unit 16 includes an input device, a display device, and a speaker. Examples of the input device include a touch panel, a keyboard, a switch, and a button. The driver can input information such as a destination to the HMI unit 16 using the input device. The information input from the drivers is transmitted to the vehicle ECU 30 at any time.

The communication device 18 functions as an information acquisition means that receives peripheral information from a roadside unit provided on a road via an antenna provided in the vehicle M1. The roadside unit is a beacon device that transmits, for example, traffic congestion information, traffic information by lane, regulation information such as pause, information on traffic conditions at blind spot positions, and the like. The communication device 18 also functions as an information acquiring means for communicating with a surrounding vehicle in the vicinity of the vehicle M1 directly via an antenna or via a relay (not shown). As the peripheral information acquired here, for example, position information and speed information of peripheral vehicles are exemplified. The information received by the communication device 18 is transmitted to the vehicle ECU 30 at any time.

The navigation device 20 detects the current position of the vehicle M1 from a GPS satellite via an antenna, and detects the traveling speed of the vehicle M1, guides a route to a destination, and the like using a GPS, a speed sensor, a gyroscope, and the like. The navigation device 20 incorporates map data including detailed road information. The map data includes, for example, information on the shape of the road, the number of lanes, divergences, lane widths, and the like. The present position information, the road information, and the like acquired by the navigation device 20 are transmitted to the vehicle ECU 30 at any time.

The vehicle-state detection sensor 22 detects the traveling state of the vehicle M1. Examples of the vehicle-state detection sensor 22 include a vehicle speed sensor, a lateral acceleration sensor, and a yaw rate sensor. The data detected by the vehicle-state detection sensor 22 is transmitted to the vehicle ECU 30 at any time.

The vehicle ECU 30 corresponds to a controller of the vehicle control system 100. Typically, the vehicle ECU 30 is a microcomputer including a processor, memories, and input and output interfaces. The vehicle ECU 30 performs automated driving to automatically drive the vehicle M1 to a destination. The vehicle ECU 30 includes a path generation unit 32 and a travel control unit 34 as functional blocks for automated driving of the vehicle M1. The path generation unit 32 receives information necessary for generation of the target path from various information acquisition means via the input and output interfaces. Then, the path generation unit 32 generates a target path for moving the vehicle M1 to the destination based on the received information. The travel control unit 34 outputs information to the traveling device ECU 40 so that the vehicle M1 travels along the generated target path.

The traveling device ECU 40 is a microcomputer having the same configuration as the Vehicle ECU 30. The traveling device ECU 40 includes a plurality of ECUs. These ECUs control various types of traveling devices (not shown) for automatically traveling the vehicle M1 in accordance with various types of information input from the vehicle ECU 30. The traveling devices include a driving force output device, a steering device and a brake device. The driving force output device is a power source for generating a driving force. The steering device steers wheels. The brake device generates a braking force.

A known technique is applied to the automated driving performed by the vehicle ECU 30 except for the generation of the target path. Therefore, descriptions of the functions of the vehicle ECU 30 related to the automated driving are limited to those described above. The function related to the generation of the target path, which is a feature of the present embodiment, will be described in detail later.

1-3. Functions of Vehicle ECU

Figure 4:
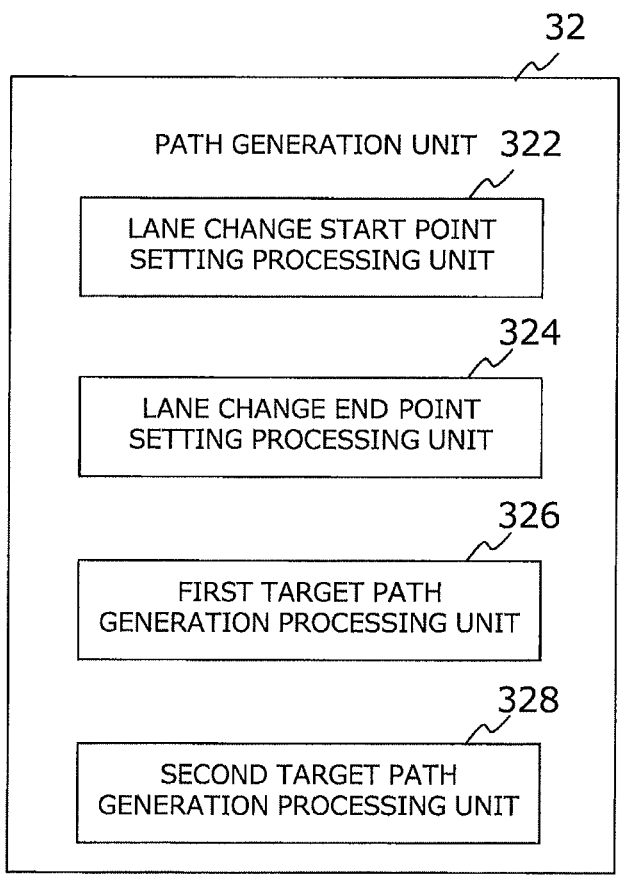
FIG. 4 is a block diagram showing a configuration of functional blocks of a path generation unit included in the vehicle ECU according to the first embodiment.

In the vehicle ECU 30 of the first embodiment, in the lane change control for performing lane change from the main lane L1 to the diverging lane L2, a target path generation process for generating the target path of the vehicle M1 is performed. The target path generation process is performed in the path generation unit 32 of the vehicle ECU 30. FIG. 4 is a block diagram showing a configuration of functional blocks of the path generation unit included in the vehicle ECU according to the first embodiment. As shown in this drawing, the path generation unit 32 of the vehicle ECU 30 includes a lane change starting point setting processing unit 322, a lane change ending point setting processing unit 324, a first target path generation processing unit 326, and a second target path generation processing unit 328 as functional blocks for generating a target path in lane change control.

Figure 5:
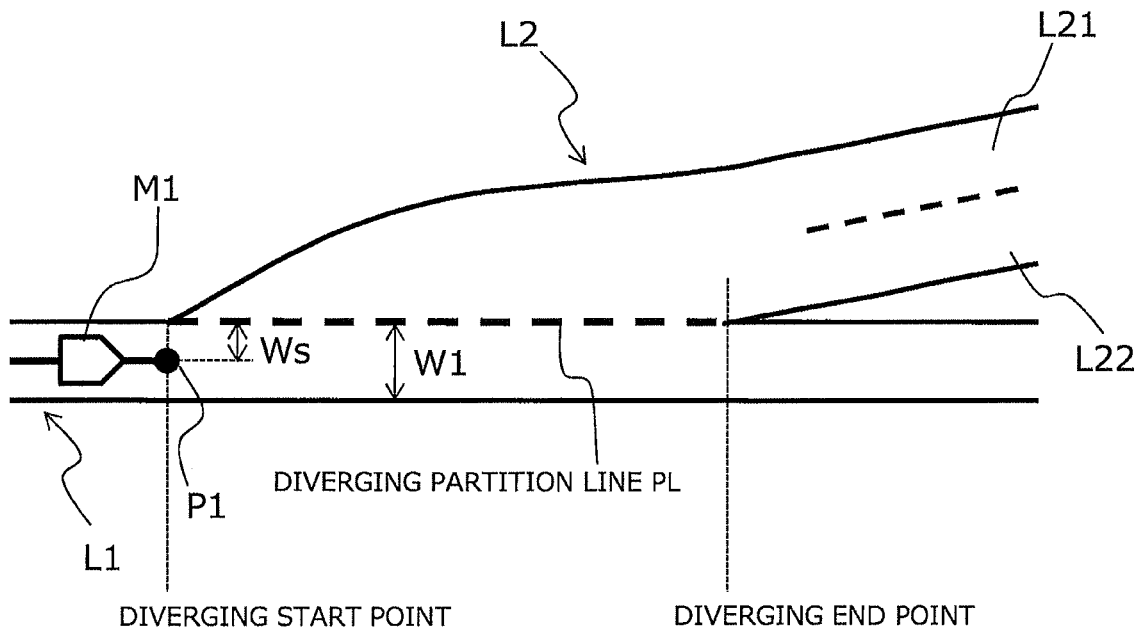
FIG. 5 is a diagram for explaining a process of setting a lane change start point.

The lane change start point setting processing unit 322 is a functional block for setting the lane change start point P1. FIG. 5 is a diagram for explaining a process of setting the lane change start point. Specifically, the lane change start point setting processing unit 322 receives information such as the position of the diverging start point specified from the map data built in the navigation device 20, detailed road information, the diverging partition line PL, the current position of the vehicle M1, and the like. Then, based on the input information, the lane change start point setting processing unit 322 sets the lane change start point P1 to a point at which the position in the vehicle traveling direction becomes the diverging start point and the distance Ws from the diverging partition line PL in the vehicle width direction becomes a half of the lane width W1 of the main lane L1 (i.e., a point at which Ws=½*W).

It should be noted that the position of the lane change start point P1 in the vehicle traveling direction is not limited to the case where the position is set to the diverging start point. That is, the lane change start point P1 can be set to an arbitrary point in the diverging zone from the diverging start point to the diverging end point.

Figure 6:
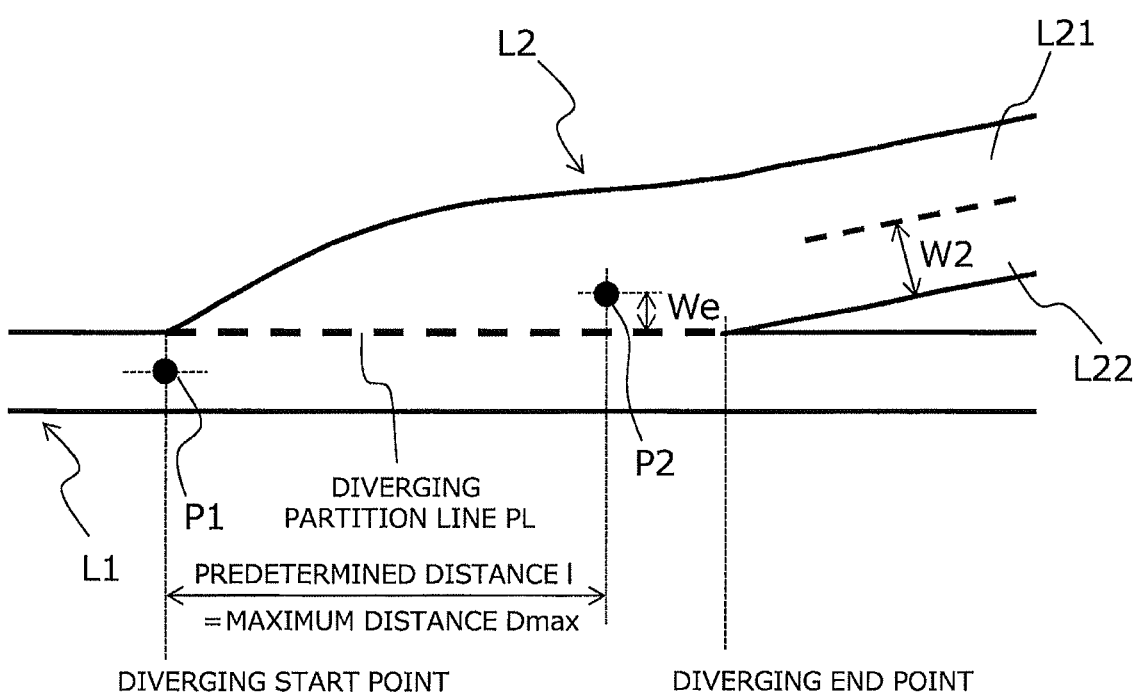
FIG. 6 is a diagram for explaining a process of setting a lane change end point.

The lane change end point setting processing unit 324 is a functional block for setting the lane change end point P2. FIG. 6 is a diagram for explaining a process of setting the lane change end point. Specifically, the lane change end point setting processing unit 324 receives information such as the position of the diverging start point and the diverging end point identified from the map data built in the navigation device 20, detailed road information, the diverging partition line PL, the current position of the vehicle M1, and the like. The lane change start point P1 set by the lane change start point setting processing unit 322 is also input to the lane change end point setting processing unit 324. Then, based on the input information, the lane change end point setting processing unit 324 sets, as the lane change end point P2, a point at which the position in the vehicle traveling direction is a predetermined distance l from the lane change start point P1 and the position in the vehicle width direction is offset from the diverging partition line PL to the side of the diverging lane L2 by a predetermined offset amount We.

For example, when a distance obtained by multiplying the limited vehicle speed of the diverging lane L2 by a predetermined time (for example, 9 seconds) is defined as the maximum distance D max (upper limit), the predetermined distance l can be set to any value equal to or less than the maximum distance D max, preferably the maximum distance D max. In this manner, by setting the upper limit to the predetermined distance l, it is possible to prevent the driver from feeling uncomfortable due to the long time required for the lane change. In addition, by setting the upper limit value using the limited vehicle speed of the diverging lane L2, it becomes possible to more adapt to the driving mode of the surrounding vehicle than in the case of using the current speed of the vehicle M1.

The maximum distance D max may be a distance obtained by multiplying the target speed during lane change control by a predetermined time, a distance obtained by multiplying the present speed of the vehicle M1 by a predetermined time, or a fixed distance threshold, in addition to a mode in which the limited vehicle speed is used.

The offset amount We may be any offset amount as long as the vehicle M1 is completely included on the side of the diverging lane L2 across the diverging partition line PL. Preferably, the offset amount We can be set to a length of ½ of the lane width W2 of the second diverging lane L22, which is the destination of the vehicle M1, for example. According to such setting of the offset amount We, when the second diverging lane L22 is the lane closest to the main lane L1, it is possible to smoothly move from the lane change end point P2 to the second diverging lane L22 which is the diverging lane closest to the main lane L1.

The predetermined distance l may be further limited so as to be equal to or larger than the minimum distance which is the lower limit. Such a minimum distance is a limit for preventing an abrupt lane change, and can be set to an arbitrary distance within a range in which this purpose can be achieved.

Figure 7:
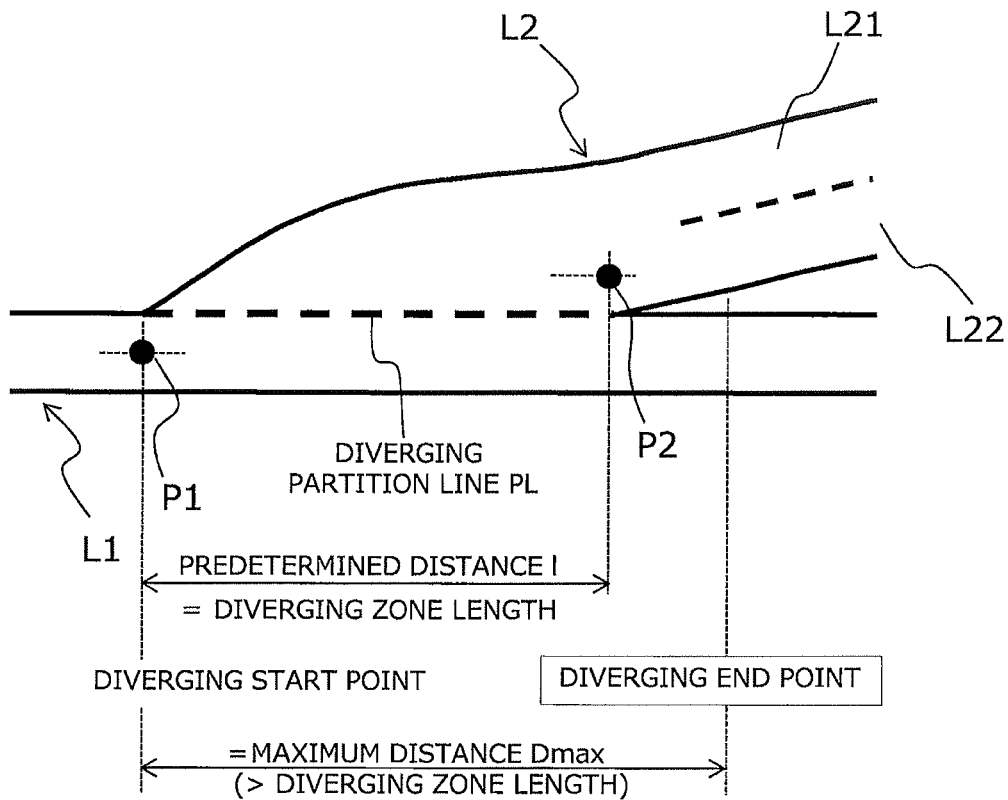
FIG. 7 is a diagram for explaining a method of setting a predetermined distance when the maximum distance is larger than the diverging zone length.

Depending on the shapes of the main lane L1 and the diverging lane L2, the maximum distance D max may be larger than the diverging zone length. FIG. 7 is a diagram for explaining how to set the predetermined distance l when the largest distance D max is larger than the diverging zone length. As shown in this drawing, when the largest distance D max is larger than the diverging zone length, for example, the predetermined distance l may be set to the diverging zone length. According to such setting of the predetermined distance l, it is possible to prevent the lane change end point P2 from being set to a point exceeding the diverging zone.

The first target path generation processing unit 326 is a functional block for generating a first target path for smoothly traveling the vehicle M1 from the lane change start point P1 to the lane change end point P2 across the diverging partition line PL. Specifically, the lane change start point P1 set by the lane change start point setting processing unit 322, the lane change end point P2 set by the lane change end point setting processing unit 324, and the diverging partition line PL are input to the first target path generation processing unit 326. The first target path generation processing unit 326 calculates the first target path using a cubic polynomial in which the following constraint conditions are set.

Figure 8:
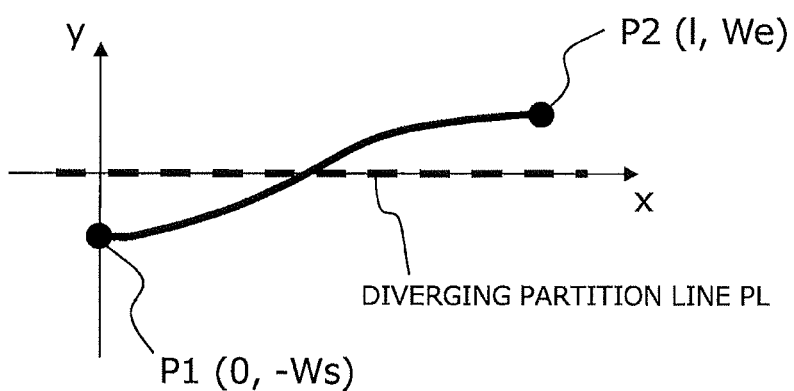
FIG. 8 is a diagram for explaining a process of generating a first target path using a cubic polynomial.

FIG. 8 is a diagram for explaining a process of generating a first target path using a cubic polynomial. As shown in this figure, first, the coordinates of the lane change start point P1, the lane change end point P2, and the diverging partition line PL are set. In this coordinate system, the traveling direction of the vehicle M1 is defined as the +x direction, and the vehicle width direction from the right side to the left side of the vehicle M1 is defined as the +y direction. The diverging partition line PL is defined as a line along the x-axis. As a result, the coordinates of the lane change start point P1 are set to (0, −Ws), and the coordinates of the lane change end point P2 are set to (l, We).

At the lane change start point P1 and the lane change end point P2, it is preferable that the vehicle M1 faces in a direction parallel to the diverging partition line PL, that is, in the +x direction. Therefore, the constraint conditions shown in Equation (2) are set in the cubic polynomial shown in Equation (1) below. Then, the coefficients a0, a1, a2, a3 satisfying the constraint condition shown in the equation (2) is calculated.

[Equation 1]

$$y(x)=a_0+a_1x+a_2x^2+a_3x^3 \qquad (1)$$

[Equation 2]

$$y(0)=-W_s, \dot{y}(0)=0, y(l)=W_e, \dot{y}(l)=0 \qquad (2)$$

The first target path generation processing unit 326 calculates y corresponding to each x using Equation (1), thereby generating a target first path connecting the lane change start point P1 and the lane change end point P2.

Note that the polynomial used in the first target path generation processing unit 326 is not limited to the one of the equation (1). That is, the polynomial here may be, for example, a fifth-order polynomial in which the constraint conditions are further increased.

Figure 9:
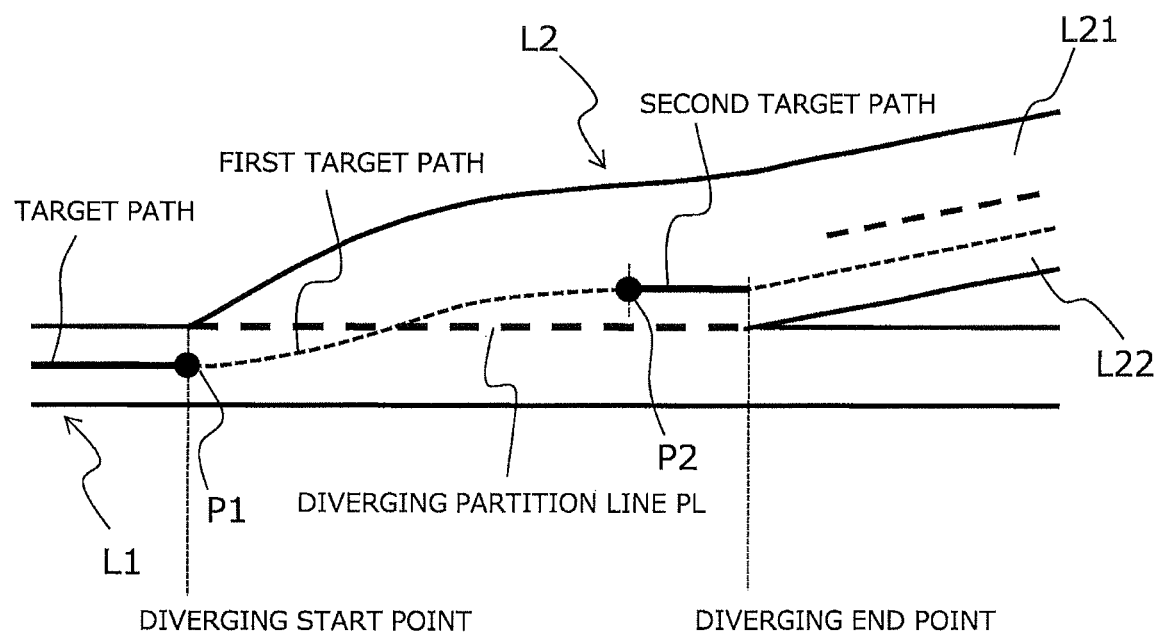
FIG. 9 is a diagram for explaining a process of generating a second target path.

The second target path generation processing unit 328 is a functional block for generating a second target path for smoothly traveling the vehicle M1 from the lane change end point P2 to the diverging end point. FIG. 9 is a diagram for explaining the process of generating the second target path. Specifically, the lane change end point P2 and the diverging partition line PL set by the lane change end point setting processing unit 324 are input to the second target path generation processing unit 328. The second target path generation processing unit 328 generates, as a second target path, a path from the lane change end point P2 to the diverging end point in parallel with the diverging partition line PL.

When the diverging end point is set at the lane change end point P2, the second target path cannot be generated. Therefore, when the diverging end point is set at the lane change end point P2, the second target path generation processing unit 328 does not perform the process of generating the second target path. As a result, the vehicle M1 may be guided from the first target path to the second diverging lane L22.

1-4. Specific Process of Lane Change Control

Figure 10:
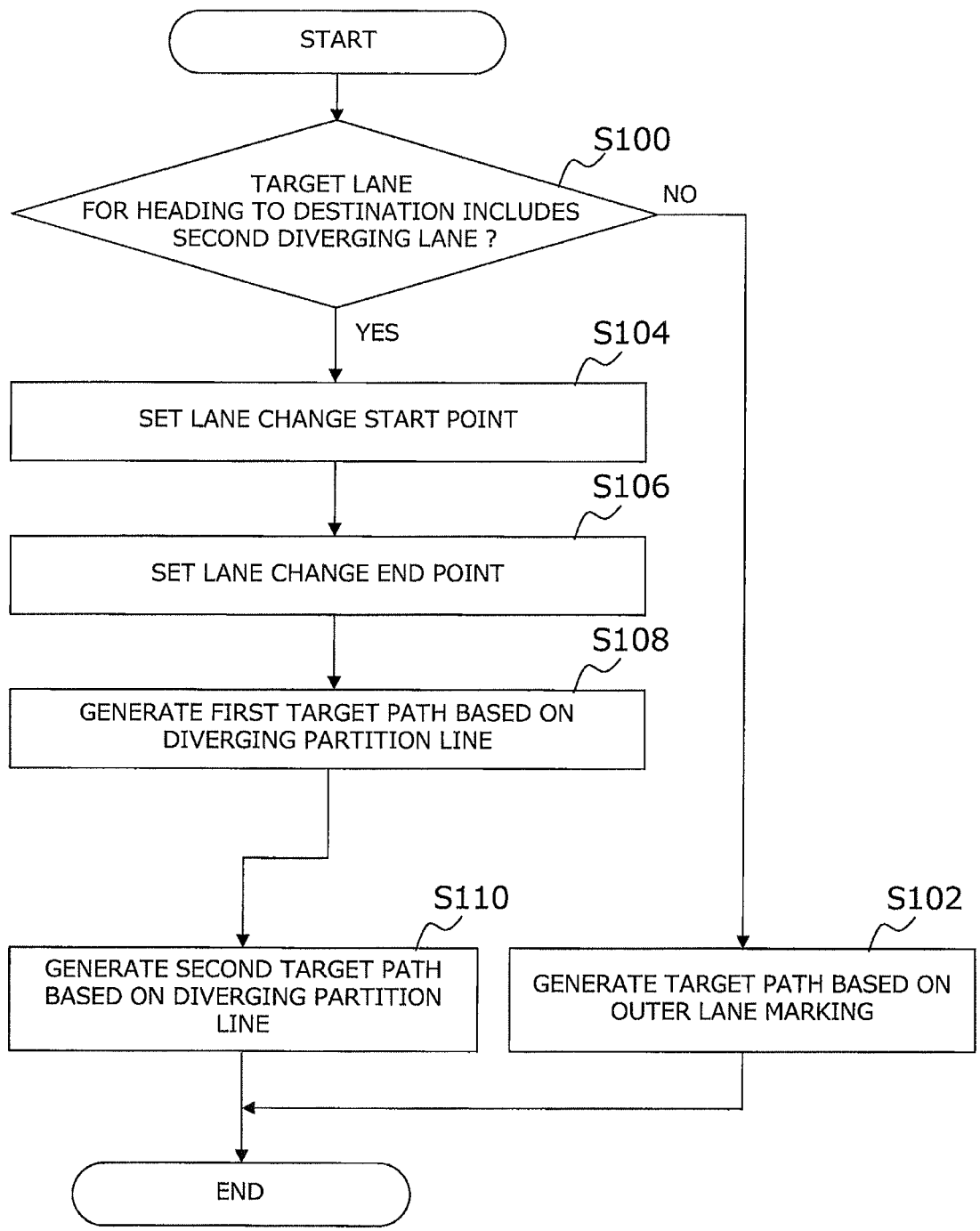
FIG. 10 is a flowchart showing a routine of the lane change control executed in the first embodiment.

Next, a specific process of lane change control executed in the vehicle control system according to the first embodiment having the above-described configuration will be described with reference to a flowchart. FIG. 10 is a flowchart showing a routine of the lane change control executed in the first embodiment. The routine shown in FIG. 10 is executed by the vehicle ECU 30 when the vehicle M1 changes the lane from the main lane L1 to the diverging lane L2.

When the routine shown in FIG. 10 is started, first, in the process of step S100, it is determined whether the target lane for heading to the destination includes the second diverging lane L22 based on the information of the present position, the road information, the destination information, and the like acquired by the navigation device 20. As a result, when it is determined that the determination is not established, it is determined that the target lane for heading to the destination includes the first diverging lane L21, and the process proceeds to the subsequent step S102.

The outer lane marking that partitions the lane boundary on the side of the diverging lane L2 in the main lane L1 continues from the main lane L1 toward the first diverging lane L21 of the diverging lane L2. Therefore, in the process of the step S102, a target path for changing the lane from the main lane L1 to the first diverging lane L21 is generated based on the outer lane marking. Here, for example, a position offset by a predetermined amount (e.g., ½ of the lane width of the first diverging lane L21) from the outer lane marking is generated as the target path. When the process of step S102 is completed, the present routine is terminated.

On the other hand, in the process of the above-mentioned step S100, when the determination is confirmed, the process proceeds to the next step S104. In the process of step S104, the lane change start point setting processing unit 322 sets the lane change start point P1. When the process of step S104 is completed, the process proceeds to the next step S106. In step S106, the lane change end point setting processing unit 324 sets the lane change end point P2.

When the process of step S106 is completed, the process proceeds to the next step S108. In step S108, the first target path generation processing unit 326 generates a first target path based on the diverging partition line PL. When the process of step S108 is completed, the process proceeds to the next step S110. In step S110, the second target path generation processing unit 328 generates a second target path based on the diverging partition line PL. When the process of step S110 is completed, the present routine is terminated.

According to such control, when the target lane of the diverging lane is the second diverging lane L22, it is possible to suppress the number of lane changes and suppress the driver's sense of discomfort and psychological anxiety.

1-5. Modification Examples of the Vehicle Control System According to First Embodiment The vehicle control system 100 according to the first embodiment may be applied with a configuration modified as described below.

Figure 11:
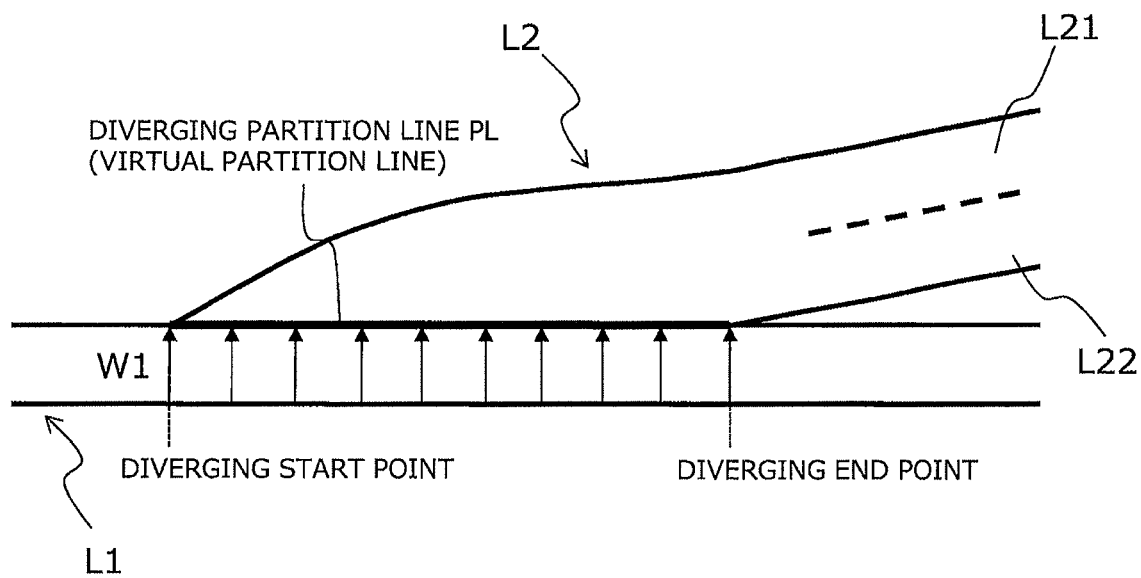
FIG. 11 is a diagram for explaining a modification of the method of specifying a diverging partition line.

The method of specifying the diverging partition line PL is not limited to the method of using the information such as the white line marked on the actual road surface stored in the road information of the navigation device 20. FIG. 11 is a diagram for explaining a modification of the method of specifying a diverging partition line. As shown in this drawing, a virtual partition line obtained by offsetting the outer partition line of the main lane L1 by the lane width W1 of the main lane L1 may be specified as the diverging partition line PL. According to such a method, even when the actual diverging partition line PL is not drawn between the main lane L1 and the diverging lane L2, it is possible to specify the virtual diverging partition line PL.

What is claimed is:

1. A vehicle control system mounted on a vehicle,
the vehicle control system comprising a controller for generating a target path for the vehicle to change a lane from a main lane to a diverging lane in a diverging zone from a diverging start point to a diverging end point, and causing the vehicle to travel so as to follow the target path, the diverging lane including a plurality of lanes divided into a first diverging lane farthest from the main lane and a second diverging lane closer to the main lane than the first diverging lane,
wherein when traveling from the main lane through the second diverging lane of the diverging lane toward a destination, the controller is configured to generate the target path based on a diverging partition line that partitions the main lane and the diverging lane in the diverging zone.

2. The vehicle control system according to claim 1,
wherein the controller is configured to execute:
a first target path generation process for generating a first target path that reaches the lane change end point in the diverging lane after crossing the diverging partition line from the lane change start point in the main lane, and
a second target path generation process for generating a second target path that travels in parallel along the diverging partition line from the lane change end point.

3. The vehicle control system according to claim 2,
wherein the controller is configured to set a position obtained by offsetting a predetermined amount from the diverging partition line to a side of the diverging lane to the lane change end point.

4. The vehicle control system according to claim 3,
wherein the second diverging lane is a lane closest to the main lane, and
wherein the predetermined amount is set to ½ of a width of the second diverging lane.

5. The vehicle control system according to claim 2,
wherein the controller is configured to set the lane change start point and the lane change end point such that a predetermined distance from the lane change start point to the lane change end point is equal to or less than a distance obtained by multiplying a limited vehicle speed in the target path by a predetermined time.

6. The vehicle control system according to claim 5,
wherein the predetermined distance is equal to or greater than a predetermined minimum distance.

7. The vehicle control system according to claim 5,
wherein the controller is configured to set the diverging start point to the lane change start point.

8. The vehicle control system according to claim 7,
wherein the controller is configured to set the diverging end point to the lane change end point when the predetermined distance is longer than a length of the diverging zone.

9. The vehicle control system according to claim 8,
wherein the controller is configured not to perform the second target path generation process when the diverging end point is set to the lane change end point.

10. The vehicle control system according to claim 2,
wherein the first target path generation process is configured to generate the first target path such that a traveling direction of the vehicle is parallel to the diverging partition line at the lane change end point.

11. The vehicle control system according to claim 1, wherein the controller is configured to use a virtual partition line obtained by offsetting an outer lane marking defining a lane boundary of the main lane by a lane width of the main lane as the diverging partition line.

* * * * *